L. E. TICHENOR & S. E. McANULTY.
VEHICLE SPOKE.
APPLICATION FILED JUNE 7, 1911.
1,019,560.
Patented Mar. 5, 1912.
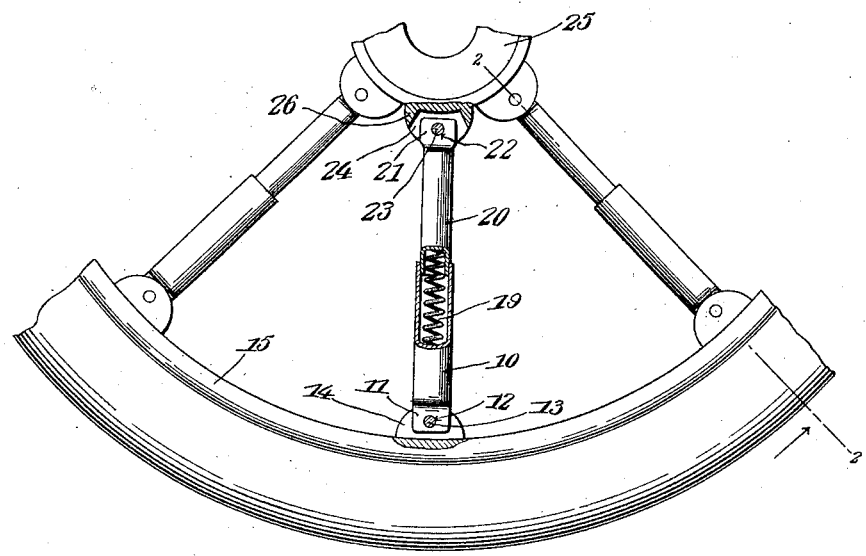
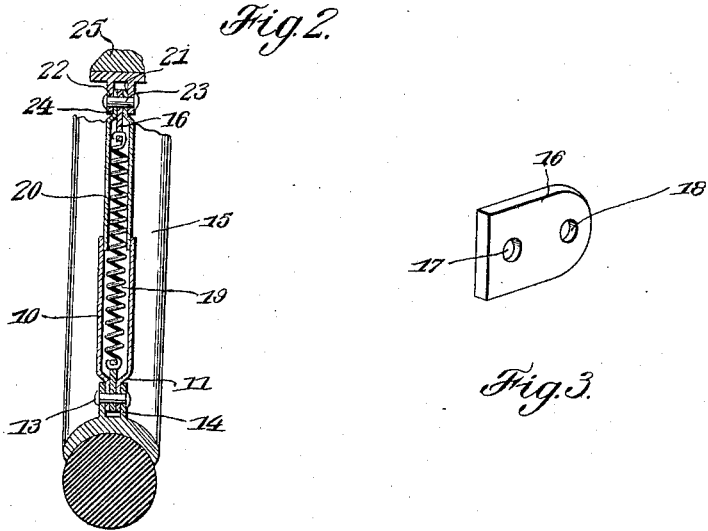

UNITED STATES PATENT OFFICE.

LEWIS ELSTON TICHENOR AND SAMUEL EDWARD McANULTY, OF SARATOGA, WYOMING.

VEHICLE-SPOKE.

1,019,560.  Specification of Letters Patent.  Patented Mar. 5, 1912.

Application filed June 7, 1911. Serial No. 631,775.

*To all whom it may concern:*

Be it known that we, LEWIS ELSTON TICHENOR and SAMUEL EDWARD McANULTY, citizens of the United States, residing at Saratoga, in the county of Carbon and State of Wyoming, have invented new and useful Improvements in Vehicle-Spokes, of which the following is a specification.

An object of the invention is to provide a resilient spoke for vehicle wheels to cushion the outer felly of the wheel relatively to the hub thereof.

For the purpose mentioned, use is made of a plurality of tubular casings, telescopically arranged, a spring for insertion in one of the casings and adapted to be engaged by the other casing, one of the said casings being adapted for connection with the felly of a wheel and the other for connection with the hub of the wheel and means for retaining the spring in engagement with both of the said casings.

Reference is to be had to the accompanying drawings constituting a part of this specification, in which similar characters of reference denote corresponding parts in all the views, and in which—

Figure 1 is a fragmentary view of a wheel showing our spokes applied thereto, one of the spokes being shown in full lines and parts being broken away to disclose another of the spokes. Fig. 2 is a sectional view of our spoke taken on the line 2—2 in Fig. 1, looking in the direction of the arrow. Fig. 3 is a perspective view of the retaining member.

Referring more particularly to the views, we provide a tubular casing 10 having an end 11 thereof swaged and provided with an aperture 12 adapted to receive a pin 13 therethrough for pivotally mounting the said casing on lugs 14 of a vehicle felly 15. A retaining member 16 is positioned in the swaged end of the casing 10, the said member being provided with an aperture 17 adapted to aline with the aperture 12 in the casing 10, with the said casing swaged to the retaining member 16, the pin 13 being passed through the aperture 17 of the retaining member 16. The retaining member 16 is provided with a second aperture 18 to which the end of a helical spring 19 is secured, the said spring being of an expansible nature and extending longitudinally in the casing 10. A second casing 20 is provided for telescopical engagement with the casing 10 and the second casing 20 is adapted to engage the spring 19, the said second casing being provided with a swaged end 21 having an aperture 22 therein and through which is extended a pin 23 having connection with lugs 24 secured to a vehicle hub 25, the said lugs 24 being provided with integral projections 26 for limiting the swinging movement of the casing 20 relatively to the hub 25.

By arranging the casing 20 in telescopical relation with the casing 10 and the spring 19 in engagement with the casing 20, the said casing 20 will be normally retained in its outermost position, relatively to the casing 10, by the spring 19, thus providing a cushion between the felly 15 and the hub 25. In the use of the retaining member 16, a body is provided around which an end of the casing 10 can be swaged, a body is provided for the reception of a pin for pivotally connecting the casing to a vehicle felly or the like and a body is provided for retaining the end of a spring. Thus it will be seen that we not only employ the retaining member as a means for positioning the spring 19 on the casing 10, but the provision of the said member produces a strong and substantial end for the casing 10, the said end being adapted for pivotal engagement with the vehicle felly 15 so that the casing 10 will not be weakened or tend to bend at the point of connection with the vehicle felly.

Having thus fully described the invention, what we claim as new, is:—

In combination with a tubular casing having a swaged end provided with registering apertures, a second tubular casing for telescopical engagement with the first casing and having a swaged end provided with registering apertures, retaining members mounted on the swaged ends of the said casings, pins extending through the registering apertures in the said swaged ends and apertures in the said retaining members to rigidly secure the retaining members to the said swaged ends and a spring mounted in the said casings, the ends of the said springs being secured to the said retaining members by passing the ends of the said springs through apertures in the free ends of the said retaining members.

In testimony whereof we affix our signatures in presence of two witnesses.

LEWIS ELSTON TICHENOR.
SAMUEL EDWARD McANULTY.

Witnesses:
G. FREDERICK CLARK,
G. W. BROODHURST.

Copies of this patent may be obtained for five cents each, by addressing the "Commissioner of Patents, Washington, D. C."